United States Patent [19]

Joannou

[11] 4,154,445
[45] May 15, 1979

[54] VISCOUS DAMPING ARRANGEMENT FOR RECORD PLAYER TONE ARMS

[76] Inventor: Constantinos J. Joannou, 2008 Dorval Ave., Ottawa, Ontario, Canada, K1G 2N8

[21] Appl. No.: 822,954

[22] Filed: Aug. 8, 1977

[51] Int. Cl.² .............................................. G11B 3/10
[52] U.S. Cl. .................................................. 274/23 R
[58] Field of Search ....................................... 274/23 R

[56] References Cited

U.S. PATENT DOCUMENTS 2,676,806  4/1954  Bachman ........................... 274/23 R

FOREIGN PATENT DOCUMENTS 977841  12/1964  United Kingdom .................. 274/23 R Primary Examiner—Harry N. Haroian

[57] ABSTRACT

This invention relates to a viscous damping arrangement for record player tone-arms in which the fluid container is part of the arm and is located at the arm's center of rotation. A stationary sphere is immersed in the fluid and the container rotates around it.

4 Claims, 6 Drawing Figures

VISCOUS DAMPING ARRANGEMENT FOR RECORD PLAYER TONE ARMS

In present high fidelity record player tone-arms viscous damping is used to dampen resonant reponses. The arrangement usually consists of an inverted cup attached to the arm, and the open end of the cup is immersed in viscous fluid contained in a circular trough which is fixed to the stationary base of the tone-arm. This arrangement has two disadvantages:

(a) The fluid can be spilled if the tone-arm (or record player) is shipped with the fluid in it. As a result, the fluid is packaged in a separate sealed container and the customer is expected to transfer the fluid to the tone-arm. Also, this arrangement makes it difficult to service a record player with such a tone-arm on it since the tone-arm has to remain in a horizontal position;

(b) This arrangement does not provide for equal coefficient of viscous friction when the arm rotates in the vertical and horizontal planes.

My present invention has the advantage of eliminating these difficulties. It is an object of my invention to provide a viscous damping arrangement for record player tone-arms in which the viscous fluid can be readily sealed to facilitate maintenance and shipment. Another object of my invention is to provide equal viscous friction coefficient in both vertical and horizontal movements of the tone-arm. Yet another object of my invention is to provide a viscous damping arrangement which can be used with tone-arms having different types of suspension systems.

These and other aspects of my invention are described in the following disclosure and drawings.

Figure 1:
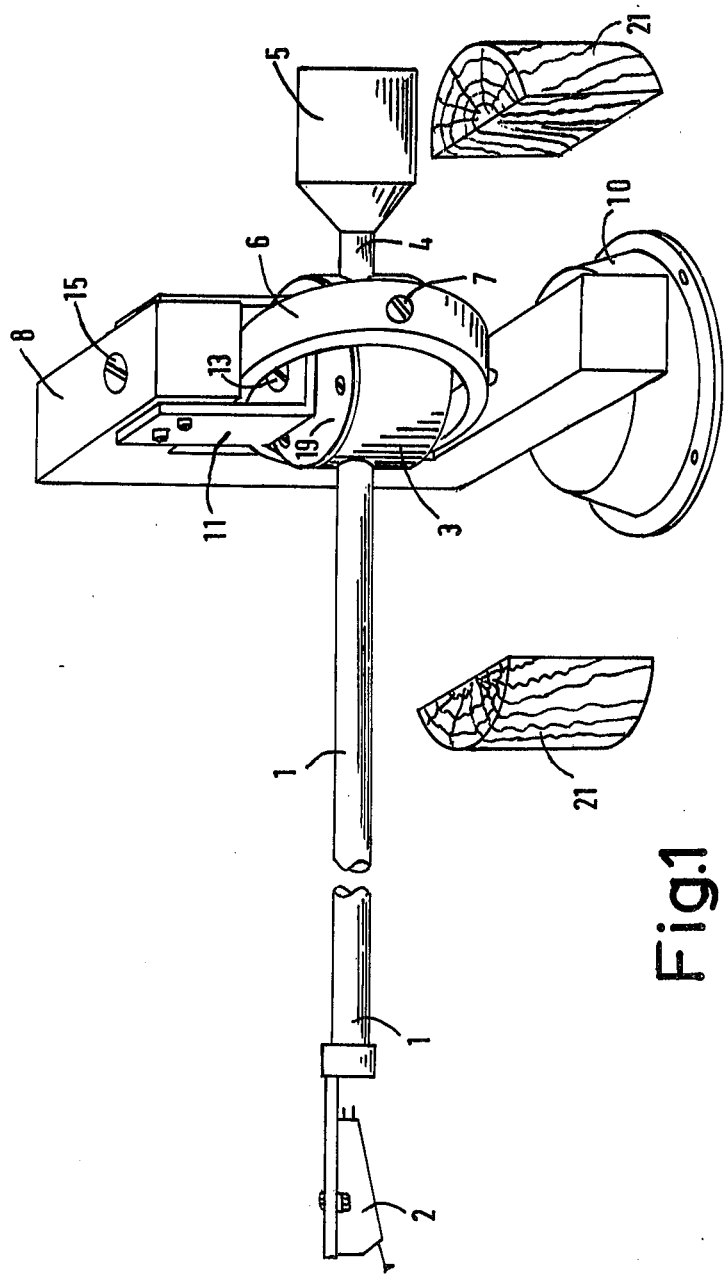
FIG. 1 is a pictorial view showing the arm with the viscous fluid container incorporated in a gimbal suspension type of tone-arm.
Figure 2:
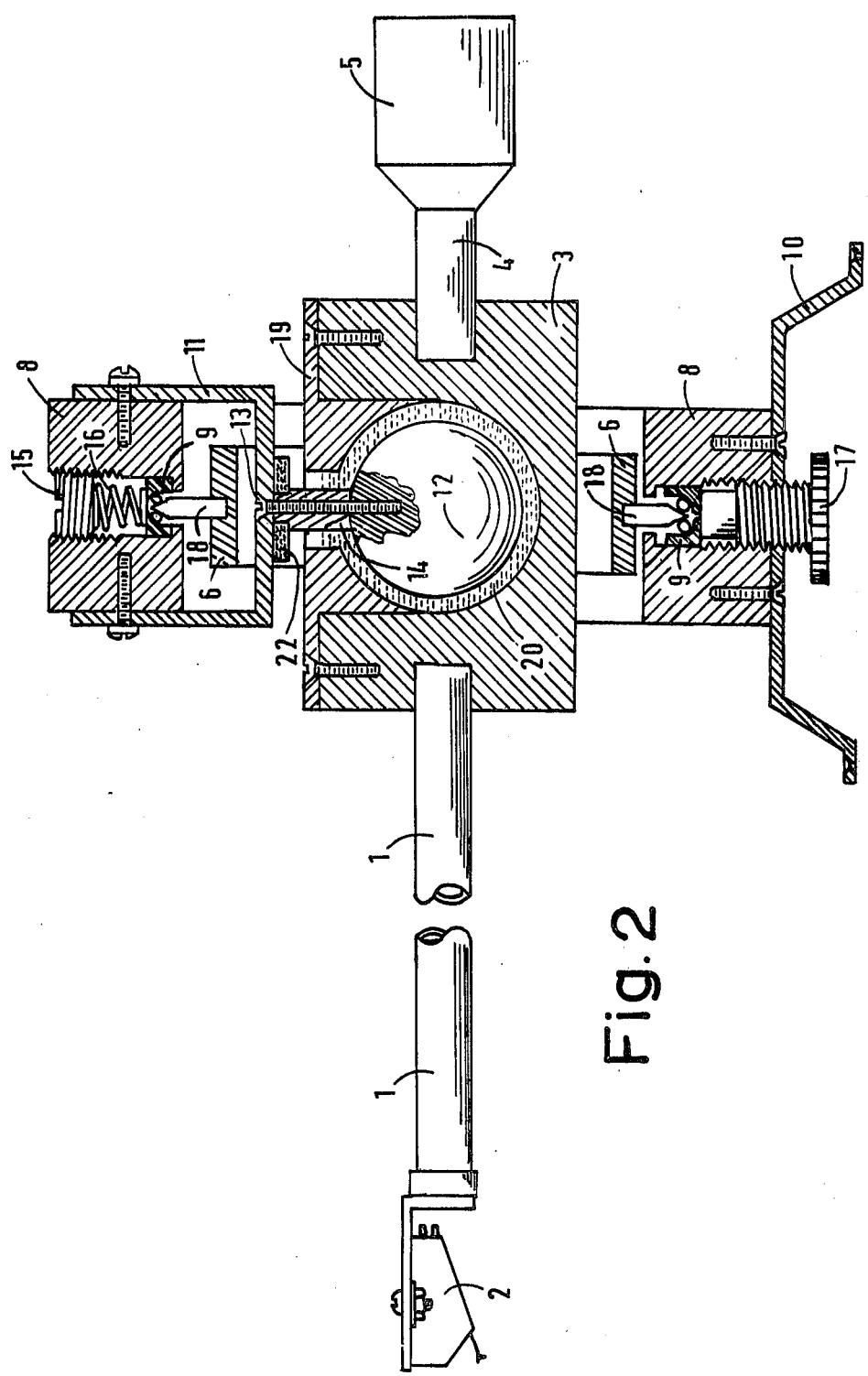
FIG. 2 is a cross-sectional view of the gimbal type tone-arm showing the fluid container and the stationary sphere.

In FIG. 1, 1 is the arm of the tone-arm assembly supporting cartridge 2. 3 is a cylindrical viscous fluid container on which arm 1 and counterbalance support shank 4 are attached. 5 is the counterbalance of the arm. 6 is a gimbal in the form of a ring which supports container 3 via two horizontal bearings 7 at opposite sides of the ring. Ring 6 is supported by main frame 8 via two vertical bearings 15 (FIG. 2). Main frame 8 is fixed to base 10 which is normally mounted on a record player. 11 is a U-shaped member affixed to main frame 8 and its purpose is to support sphere 12 (FIG. 2) via screw 13 and hollow shaft 14. 15 is a screw retaining spring 16 which presses against upper bearing 9. 17 is an adjusting screw for adjusting the distance between bearings 9 and thus adjusting the play in the bearings. Note that the races of bearings 9 fit loosely in their seats. 18 are pointed shafts fixed to gimbal 6 and form part of the bearing arrangement. 19 is a cover for container 3. Cover 19 has a hole in its center which is considerably larger than hollow shaft 14, thus allowing the container and cover to rotate slightly in the vertical plane (around bearings 7). Also, cover 19 is shaped so that when fitted onto container 3, the inside of the container and the cover form a spherical cavity which is larger than sphere 12, thus allowing space for viscous fluid 20.

The arrangement described above operates as follows: During normal operation of the tone-arm, the arm is free to rotate by a small amount in a horizontal plane via bearings 9. The rotation is limited only by gimbal 6 touching member 11. When the arm rotates in the horizontal plane, container 3 and cover 19 rotate around sphere 12 which is stationary. Since there is viscous fluid between the container and the sphere, viscous friction is provided and the arm is viscously damped. The same happens when the arm rotates in the vertical plane. And since the arrangement is symmetrical in a vertical and horizontal plane, the coefficient of friction is the same in both cases.

Figure 3:
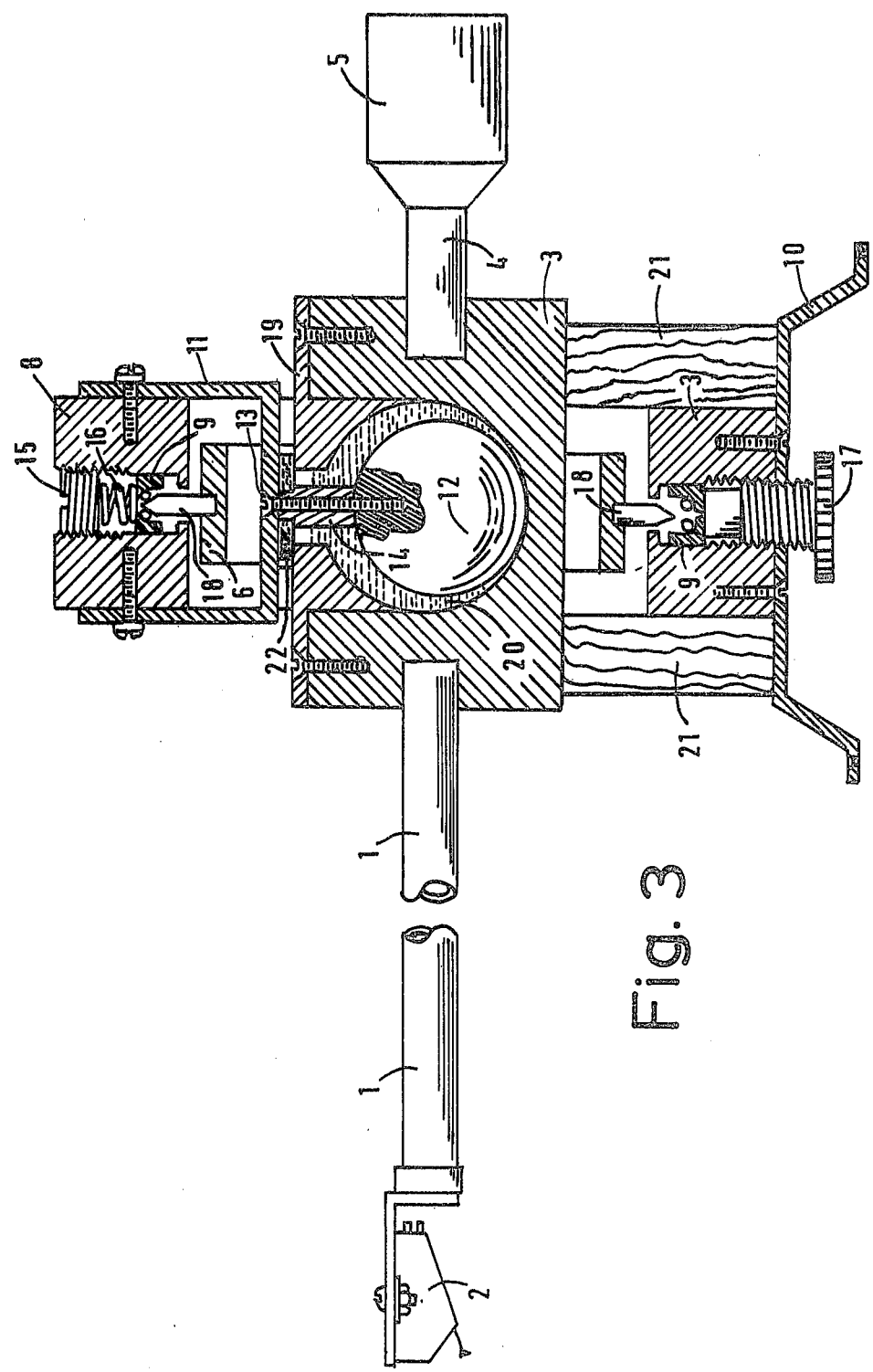
FIG. 3 is the same view as that of FIG. 2, but with the shipping blocks in place and the fluid container sealed.

Another feature of the arrangement described is that the fluid container can be sealed for service or shipment. To seal the container, blocks 21 are inserted between base 10 and container 3, thus lifting up the whole arm/container assembly as shown in FIG. 3. When this happens, upper shaft 18 lifts upper bearing 9 against spring 16 and the top of cover 19 presses against resilient ring 22, thus sealing the viscous fluid in the container.

Figure 4:
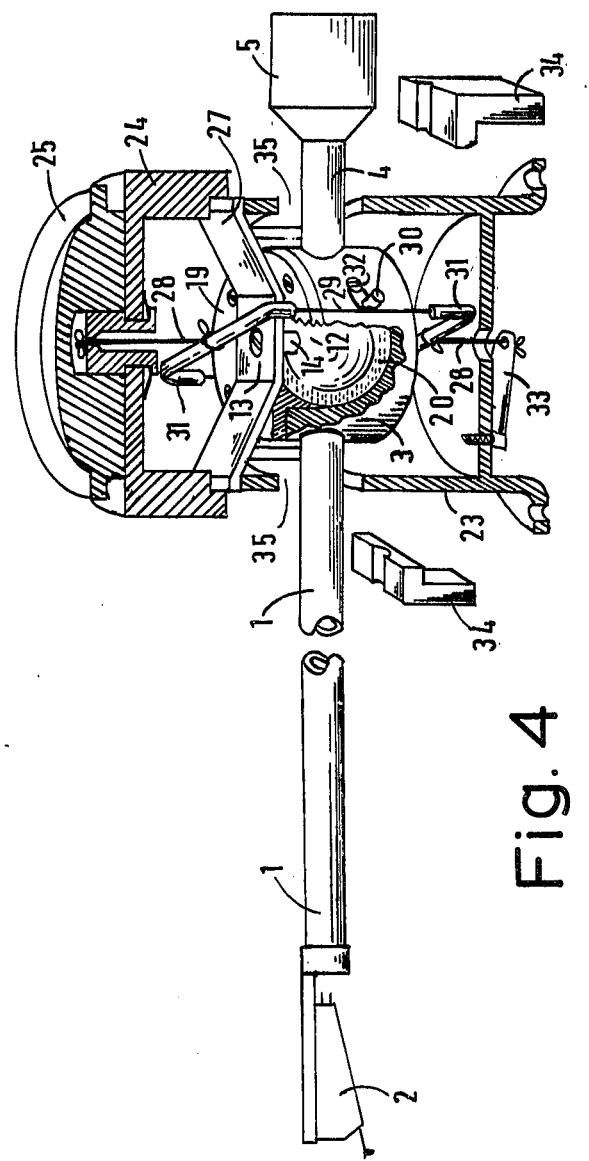
FIG. 4 is a pictorial view showing the fluid container and sphere system in a taut-band suspension type tone-arm.

FIG. 4 shows the same viscous fluid damping arrangement in a taut-band suspension type tone-arm (Ref. U.S. Pat. No. 3,836,155). 23 is the outer housing of the tone-arm which is fixed to the record player. 24 is a top cover of the housing which is provided with knob 25. Knob 25 turns hollow shaft 26 and thus twists cords 28 to provide antiskating torque. 27 is a stationary member which is held firm on housing 23 by cover 24. Member 27 supports sphere 12 via hollow shaft 14 and screw 13. Viscous fluid container 3 is suspended on cords 28 and 29 via shafts 30 (fixed to 3) and U-shaped members 31. Cords 29 are wound once around shafts 39 and cord retaining screws 32. All cords are stretched by leaf-spring element 33 at the base of housing 23.

Operation of this type of tone-arm is as follows: The arm is free to rotate in a horizontal plane. When this happens, cords 28 twist and offer no resistance. Container 3 rotates with the arm around stationary sphere 12 and due to viscous fluid 20 being present between the sphere and container 3 viscous damping is provided. The arm rotation in the horizontal plane is limited by the length of slots 35. The arm is also free to rotate partially in a vertical plane. This movement is limited by the width of slots 35. When this happens, the upper parts of cords 29 wind and the lower parts of cords 29 unwind on shafts 30, thus again offering no resistance, container 3 rotates around sphere 12, and again due to viscous fluid 20 viscous damping is provided.

Figure 5:
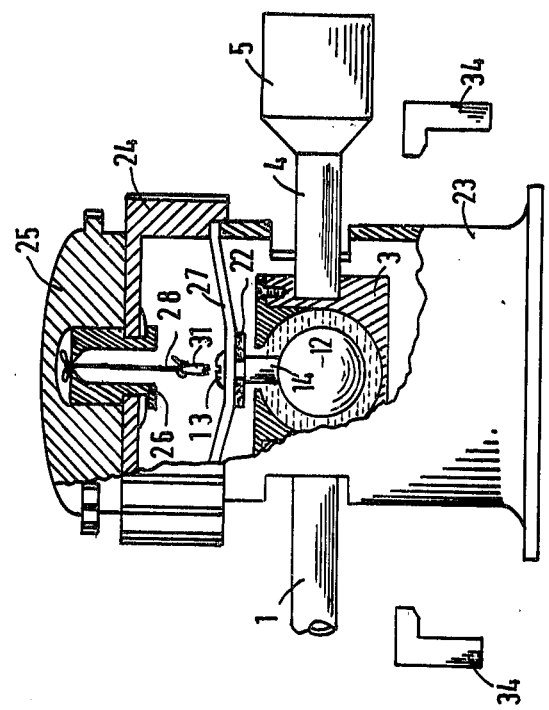
FIG. 5 shows the tone-arm of FIG. 4 in profile, with the container and sphere arrangement in greater detail.
Figure 6:
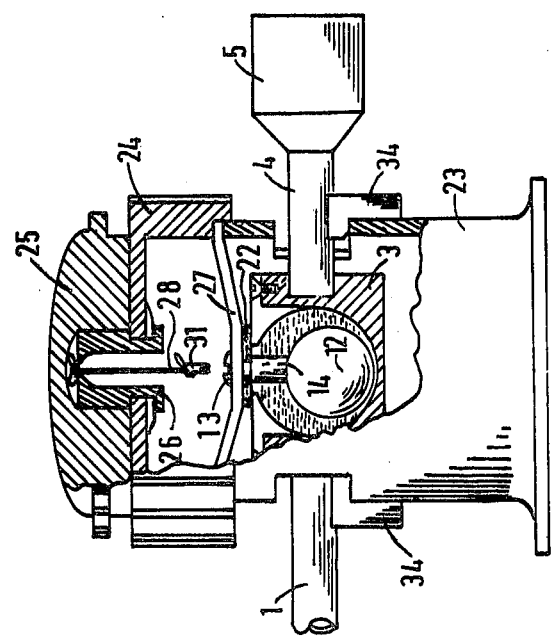
FIG. 6 is the same view as FIG. 5, but with the shipping blocks inserted and the fluid container sealed.

FIG. 5 and FIG. 6 show how the viscous fluid in the taut-band type tone-arm can be sealed. FIG. 5 shows the tone-arm in normal operation, and FIG. 6 shows the tone-arm with shipping blocks 34 inserted in slots 35. When the shipping blocks are inserted, the arm with the fluid container and counterweight lifts upwards and the top of cover 19 presses against resilient ring 22 thus sealing the fluid in container 3. Note that the suspension system allows some vertical movement of the arm assembly. When the assembly is moved upwards, lower cord 28 pulls leaf spring 33 which flexes and thus allows movement in this direction.

It is interesting to note here that the viscous damping arrangement described here also dampens oscillations along the axis of the arm which may be set up by the compliance of the taut-band suspension and the mass of the arm assembly.

It is possible to use a different shape of stationary element immersed in the viscous fluid instead of sphere 12. For instance, a disc or a cube may be used, which are simpler to manufacture. Also, to increase the coefficient of viscous friction, a sphere (or any other shape) with fins or protrusions on its surface may be used.

It is also possible to arrange the suspension system so that the container and arm assembly is moveable in the downward direction and a resilient ring can be provided at the top of the sphere under cover 19. By moving the container downwards, the resilient ring will close the hole of cover 19 and thus seal the container from inside.

What I claim is:

1. A viscously damped record player tone arm comprising: a stationary frame member; a pick-up arm with counterweight; a hollow container containing viscous fluid, said container being open at the top and being attached to said pick-up arm near said counterweight; a suspension system comprising a gimbal arrangement which rotatably attached said pick-up arm and said counterweight to said stationary frame via said viscous fluid container in such a way as to allow said pick-up arm to rotate freely in the vertical and horizontal planes about a single point of rotation and having the geometrical centre of said reservoir coincident with said point of rotation; an essentially spherical member immersed in said fluid in said container, said spherical member being affixed to said stationary frame and having the geometrical center of said spherical member coincident with said point of rotation of said pick-up arm and said reservoir thus providing equal coefficient of viscous friction when said pick-up arm rotates in the vertical and horizontal planes by virtue of shearing forces produced in said fluid between the outside surface of said spherical member and the inside surface of said hollow container.

2. A viscously damped record player tone arm as described in claim 1 in which said gimbal suspension system is so constructed as to also allow said pick-up arm, said counterweight and said reservoir to move, when forced, upwards in the vertical direction, thus having the top opening of said reservoir sealed by a cover attached to said stationary frame.

3. A viscously damped record player tone arm as described in claim 1 in which said stationary frame is essentially a vertical cylinder comprising top and bottom covers and in which said suspension system comprises: two short horizontal shafts attached to either side of said reservoir, two vertical flexible chords each having a part wound around each of said shafts, the upper ends of said chords being attached to one end of a third vertical flexible chord via a first rigid U-shaped member, the other end of said third chord being attached to the inside of said top cover of said stationary cylindrical frame, the lower ends of said chords being attached to one end of a fourth flexible chord via a second U-shaped rigid member, the other end of said fourth flexible chord being attached to the inside of said bottom cover of said stationary cylindrical frame.

4. A viscously damped record player tone arm as described in claims 1 and 3 in which said fourth flexible chord of said suspension system is attached to the inside of said bottom cover of said stationary cylindrical frame via a spring element thus allowing said pick-up arm, said counterweight and said reservoir to move, when forced, upwards in the vertical direction and thus having the top opening of said reservoir sealed by a cover attached to the inside of said stationary cylindrical frame.

* * * * *